United States Patent [19]

Krehan et al.

[11] Patent Number: 4,902,032
[45] Date of Patent: Feb. 20, 1990

[54] MOTOR VEHICLE STEERING

[75] Inventors: Peter Krehan, Russelsheim; Werner Oppelt, Trebur, both of Fed. Rep. of Germany

[73] Assignee: General Motors Corporation, Detroit, Mich.

[21] Appl. No.: 290,651

[22] Filed: Dec. 23, 1988

[30] Foreign Application Priority Data

Dec. 24, 1987 [DE] Fed. Rep. of Germany ....... 3744089

[51] Int. Cl.$^4$ .............................................. B22D 17/00
[52] U.S. Cl. ..................................... 280/661; 280/688
[58] Field of Search .............. 280/688, 723, 691, 661, 280/688, 690, 702, 705

[56] References Cited

U.S. PATENT DOCUMENTS 4,726,603 2/1988 Sugiyama et al. .................. 280/661
4,744,586 5/1988 Shibahata et al. .................. 280/661

FOREIGN PATENT DOCUMENTS 1928401 6/1969 Fed. Rep. of Germany .

Primary Examiner—Richard A. Bertsch
Attorney, Agent, or Firm—Saul Schwartz

[57] ABSTRACT

In a motor vehicle steering systm, the two tie rods are fastened by means of resilient tie rod bushings onto a support element of the steering gear. A piston and cylinder unit connected to the braking system presses the tie rod bushings apart when the brakes are actuated and thus moves the tie rods outward, so that the steered wheels move to a toed-in position.

5 Claims, 3 Drawing Sheets

MOTOR VEHICLE STEERING

FIELD OF THE INVENTION

The invention pertains to a motor vehicle steering system in which the tie rods are fastened to the steering gear by means of resilient tie rod bushings. Such motor vehicle steering systems are provided in current passenger cars and are therefore generally known.

BACKGROUND OF THE INVENTION

During braking, it is desirable for the front wheels to toe in, to produce good straight-ahead stability and to reduce front end dive. At present, this is achieved by varying the resiliency of the control arm bearings.

Electronically controlled control devices have also already been disclosed with which a steering motion of one axle of the vehicle or of a single wheel can be effected to automatically compensate for interfering effects. These active control devices are, however, very expensive, since they require a supply of pressurization medium and a control electronics system. They are therefore reserved for luxury-class automobiles.

The problem on which the invention is based is that of configuring a motor vehicle steering system of the above-mentioned type such that by means of it, the steered wheels can be actively moved into a toed-in position with the simplest possible means.

SUMMARY OF THE INVENTION

According to the invention, this problem is solved by the fact that between the tie rod bushings, a piston and cylinder unit is provided, connected to the braking system, which moves the tie rod bushings apart when pressurized.

A motor vehicle steering system of this type makes it possible to turn a wheel actively towards a toed-in position during braking, without requiring great expense to do so. Since the piston and cylinder unit of the motor vehicle steering system is automatically pressurized by the braking system when the brakes are actuated, neither a separate pressurization medium supply nor an electronic control system are needed.

The motor vehicle steering system is of especially simple design if the two tie rod bushings are fastened, by their inner metal bushings, to a support element common to both, and if the outer metal bushings in each case, fastened by means of a rubber element to the inner metal bushing, are rigidly fastened to the respective tie rod, and if the piston and cylinder unit is placed so as to float between the outer metal bushings on the support element.

Another contribution to simplification of the motor vehicle steering system is made if, according to a development of the invention, the piston and cylinder unit contacts one outer metal bushing with a piston rod of its piston and contacts the other outer metal bushing with the end surface of its cylinder.

A large adjustment range without undesired high elasticity when the piston and cylinder unit is not activated can be achieved if the rubber elements of the two tie rod bushings contain an open space towards the interior of the vehicle in the unloaded state.

The potential adjustment range can be made especially large with little expense if the outer metal bushings of the tie rod bushings are oval in configuration and have their greatest diameter in the direction of the tie rod connected to them.

It is advantageous in terms of production engineering and in terms of simple and rapid assembly, if the support element is a sheet metal member of U-shaped cross section, between the upwardly pointing arms of which the tie rod bushings are placed horizontally, namely, with their ends pointing towards the arms.

The piston and cylinder unit can be easily retained in a sheet metal member between the tie rod bushings by the fact that it is retained by a section of sheet metal bent out of one arm of the support element, engaging over the piston and cylinder unit.

BRIEF DESCRIPTION OF THE DRAWINGS

The invention admits of numerous embodiments. Two of them are illustrated in the drawing and will be described below. In the drawing.

DESCRIPTION OF THE PREFERRED EMBODIMENT

Figure 1:
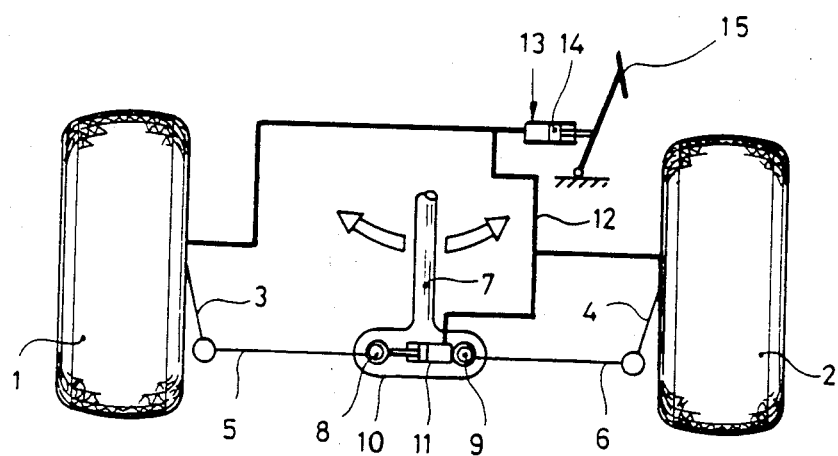
FIG. 1 shows a top view of a front axle with unbraked wheels, with the motor vehicle steering system according to the invention.

FIG. 1 shows two wheels 1,2 of a front axle, which are guided and retained in the usual way (not shown). The wheels 1,2 are steered in the usual way, by pivoting Pitman arms 3,4 by means of tie rods 5,6 which are connected to a steering arm 7, which can be pivoted by means of a steering gear (not shown).

The two tie rods 5,6 are connected to the steering arm 7 by means of tie rod bushings 8,9 which are fastened vertically on a support element 10. An important element of the invention is a piston and cylinder unit 11, which is placed so as to float between the tie rod bushings 8,9 on the support element 10 and is connected through a line 12 to the braking system 13 of the motor vehicle. Of this braking system, a braking cylinder 14 and a brake pedal 15 are illustrated.

Figure 2:
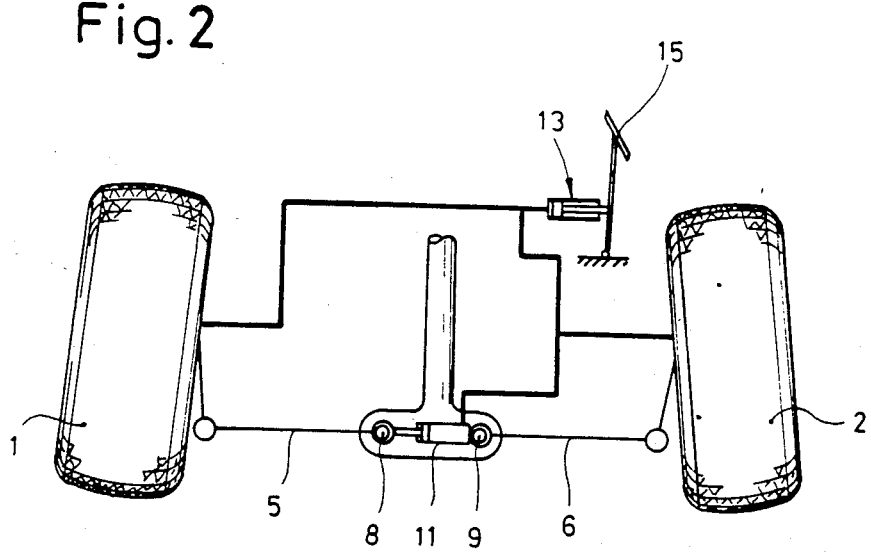
FIG. 2 shows the front axle according to FIG. 1, with the wheels braked.

FIG. 2 shows the position of the wheels 1 and 2 when the brake pedal 15 is depressed. The pressure that builds up during braking acts in the piston and cylinder unit 11 and presses the tie rod bushings 8,9 apart. As a result, the two tie rods 5,6 move slightly outward, which causes the wheels 1,2 to assume the toed-in position shown in FIG. 2. Since this displacement occurs actively under the pressure exerted by the piston and cylinder unit 11, it occurs independently of whether the steering roll radius is positive or negative.

Figure 3:
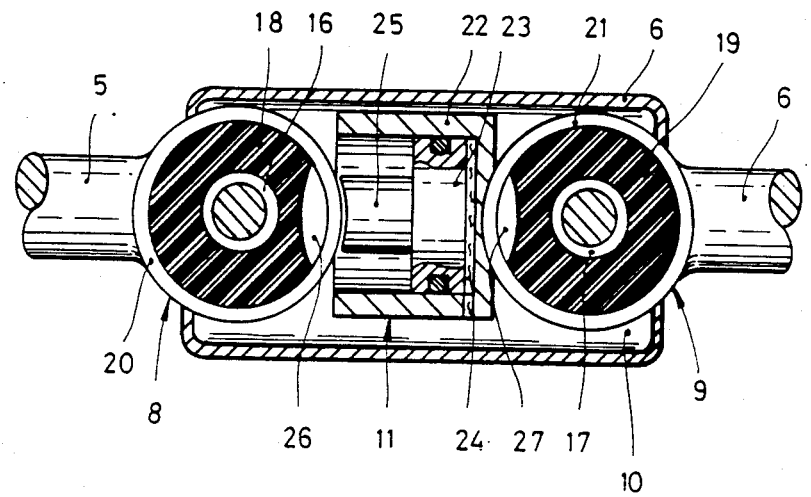
FIG. 3 shows a top view, enlarged compared to FIGS. 1 and 2, of a region of the motor vehicle steering system comprising the tie rod bushings, with the wheels unbraked.

FIG. 3 shows that the two tie rod bushings 8,9 each consist of an inner metal bushing 16,17 and an outer metal bushing 20,21 connected to the latter by means of a rubber element 18,19. Each inner metal bushing 16,17 is bolted securely to the support element 10, while each outer metal bushing 20,21 is connected to its respective tie rod 5,6.

The piston and cylinder unit 11 placed between the tie rod bushings 8,9 has a cylinder 22, the end of which contacts the outer metal bushing 21 of the tie rod bushing 9 shown on the right in the drawing. In the cylinder 22, a piston 23 delimits a pressure chamber 24, which communicates with the braking system 13 indicated in FIGS. 1 and 2. The piston 23 is supported, by means of a piston rod 25, against the outer metal bushing 20 of the tie rod bushing 8. To increase the resiliency, an open space 26,27 is provided in each of the rubber elements 18,19, towards the center of the vehicle. It is not shown that the tie rod bushings 8,9 can also be oval, so that they cannot be further deformed in the direction of their greater diameter, namely, from the outside.

Figure 4:
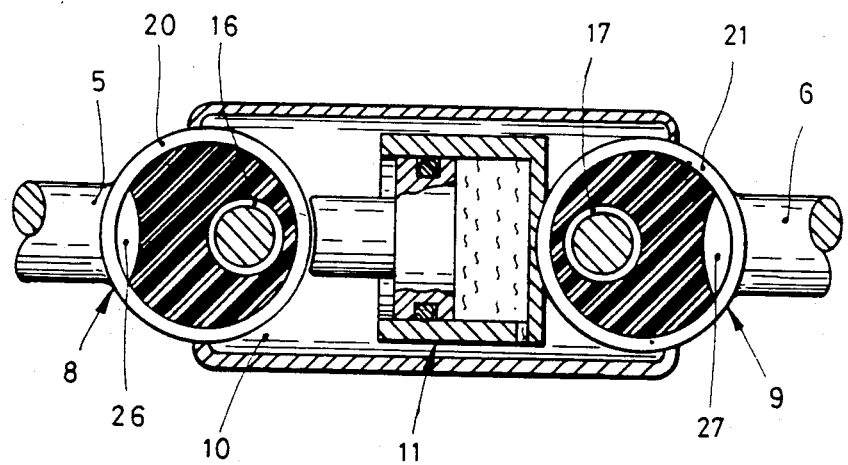
FIG. 4 shows a top view corresponding to FIG. 3, with the wheels braked.

FIG. 4 shows the arrangement according to FIG. 3, when pressurized. Note that the piston and cylinder unit 11 has pressed apart the two outer metal bushings 20,21 and therefore also the tie rids 5,6, so that they have moved outward relative to the support element 10 and the inner metal bushings 16,17 fastened thereto. The open spaces 26,27 are located, not on the inner side of the vehicle but on the outer side, in the tie rod bushings 8,9.

Figure 5:
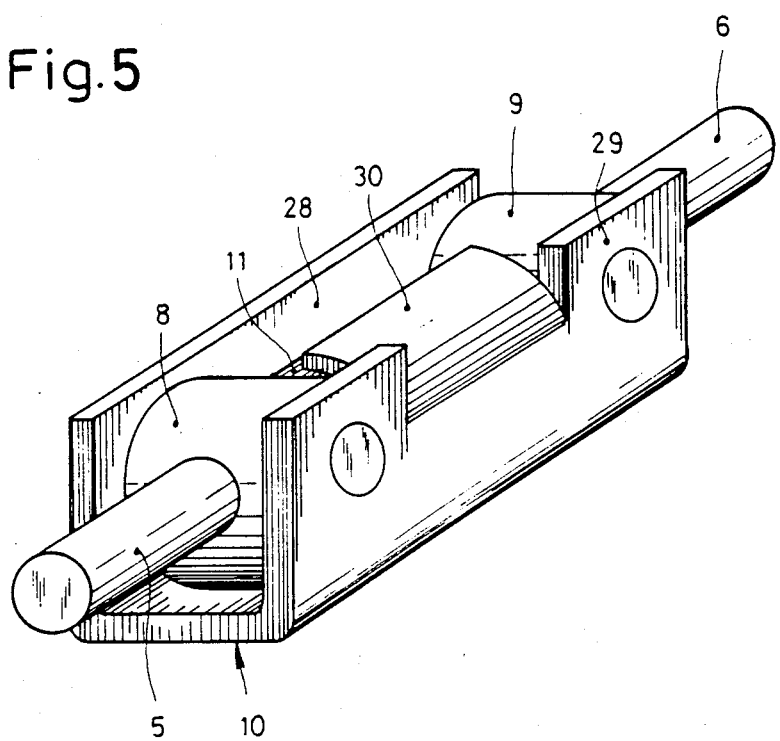
FIG. 5 shows a perspective illustration of a second embodiment of the arrangement according to FIGS. 3 and 4.

According to FIG. 5, the support element 10 is configured as a U-shaped sheet metal member, between the arms 28,29 of which the tie rod bushings 8,9 are placed horizontally. In this embodiment, the piston and cylinder unit 11 between the tie rod bushings 8,9 is retained by a sheet metal section 30 which is bent out of the arm 29 over the piston and cylinder unit 11.

The embodiment of the invention in which an exclusive property or privilege is claimed are defined as follows:

1. In a motor vehicle steering system including a pair of tie rods attached to a steering arm by means of a pair of resilient tie rod bushes, the combination comprising, a cylinder means disposed between said tie rod bushes, a piston means slidably disposed in said cylinder means, and fluid conduit means connecting said cylinder means to a fluid pressure braking system of said motor vehicle so that said piston means and said cylinder means expands between said tie rod bushes to move said tie rod bushes apart when said fluid pressure braking system of said motor vehicle is pressurized.

2. The motor vehicle steering system recited in claim 1 wherein each of said tie rod bushes includes an inner metal bush on a supporting body common to both and an outer metal bush connected to the inner metal bush by a rubber body and rigidly connected to the respective tie rod, and wherein the piston means and the cylinder means are mounted in floating relationship on the supporting body between the outer metal bushes.

3. The motor vehicle steering system recited in claim 2 wherein the rubber bodies of both tie rod bushes include a free space towards the interior of the vehicle in the unloaded state.

4. The motor vehicle steering system recited in claim 3 wherein the supporting body is a sheet metal member of U-shaped cross-section between whose parallel arms are disposed the tie rod bushes in a plane generally perpendicular to the parallel arms.

5. The motor vehicle steering system recited in claim 4 wherein the piston means and the cylinder means are held between the tie rod bushes by a section of the sheet metal member which is bent out of one of the parallel arms of the supporting body and engages over the piston means and the cylinder means.

* * * * *